United States Patent [19]

Pelletier

[11] Patent Number: 4,935,249

[45] Date of Patent: Jun. 19, 1990

[54] METHOD OF COMBINING BAKING ADDITIVES AND BAKER'S YEAST PRIOR TO USE IN PREPARING BAKED GOODS

[76] Inventor: René F. R. Pelletier, 3 Quartier Beauregard, Ezy-sur-Eure, France

[21] Appl. No.: 343,173

[22] PCT Filed: Jun. 27, 1988

[86] PCT No.: PCT/FR88/00339

§ 371 Date: Feb. 27, 1989

§ 102(e) Date: Feb. 27, 1989

[30] Foreign Application Priority Data

Jun. 30, 1987 [FR] France .................................. 87 09216

[51] Int. Cl.$^5$ ............................ A21D 2/00; A21D 2/22
[52] U.S. Cl. .......................................... 426/62; 426/64; 426/653
[58] Field of Search ...................... 426/20, 62, 64, 653, 426/656, 89, 96, 98, 128, 561

[56] References Cited

U.S. PATENT DOCUMENTS 4,642,237  2/1987  DeStefanis et al. .................. 426/20

OTHER PUBLICATIONS

Chemical Abstracts, vol. 99, No. 21, 21 Nov. 1983; 99:174491v.

Primary Examiner—Marianne Cintins
Attorney, Agent, or Firm—A. W. Breiner

[57] ABSTRACT

A method of packaging baker's yeast and one or more baking additives is provided. The additive(s) are placed in well-defined portions into one or more capsules depending on the particular additives utilized. The capsules have destructible walls and are leak-proof. The sealed capsule(s) are then placed in contact with yeast before use of the yeast. The combined additive(s) and yeast are particularly useful in breadmaking.

5 Claims, No Drawings

METHOD OF COMBINING BAKING ADDITIVES AND BAKER'S YEAST PRIOR TO USE IN PREPARING BAKED GOODS

The present invention relates to the manufacture of cooked or raw (deep-frozen) bread and viennoiserie articles, and its object is to improve the quality of the latter, particularly from the aspect of lightness, whilst simplifying the baker's task by ensuring greater reliability of metering and by enabling advantage to be taken of the improvements made by the research laboratories to the additives used to increase the activity of yeasts or leavens in fermentation.

The conventional bread-making process initially comprises placing in the kneader, in appropriate proportions, flour, water, salt and baker's yeast or leaven.

The enzymes which are naturally present in the flour play an essential part in the fermentation which takes place in the presence of the yeast.

Usually, in order to compensate for the low enzyme content of the flours, various enzymatic additives known as "improvers" are added to the kneader, these additives often taking the form of a pulverulent mixture of alpha-amylase and ascorbic acid to which soya bean lecithin fixed on flour is sometimes added. Products named "Malton", "Rapidaze" and others are commercially available.

The quantities of yeast and of additive can be varied in accordance with the quality of the flour, which itself varies from year to year.

The entire mixture is kneaded in the kneading machine, after which the dough obtained is fashioned to give it the shape which the finished loaf is to have.

The unbaked loaves resulting from this fashioning process are stood for several hours in a fermentation chamber, and finally cooked in the oven.

In the event that deep-freezing is to be used, the fashioned unbaked loaves are placed in the freezer at the end of fashioning, without passing through the fermentation chamber.

Fermentation and cooking will take place later, after defrosting, when it is desired to use the preserved unbaked loaves.

The use of the additives known as "improvers" is not without associated difficulties. The additives must not be forgotten, but they must also be metered appropriately in order for the yeast to employ its gas evolution power to the full and, in particular, to obtain a light and aerated crumb.

The use of these "improvers" has in the past been quite empirical. It is still not usual to see a baker using the improver in powder form to dust the yeast or the mixture placed in the kneader, and so to proceed without really knowing what he has done.

It has been proposed (U.S. Pat. No. 4,642,237) to place doses of alpha-amylase-based additives in envelopes having water-soluble walls in order to facilitate the operations at the bakery.

However, the problem of optimum use of the additive without possibility of error, forgetfulness or premature use in the presence of yeast, and so as to obtain the best result, has not been considered.

This problem is solved, according to the invention in that the additive is metered in advance in proportion to the yeast mixture with which it is to be used, and in that the dose, which is contained in one or more leak-tight capsules of a destructible material, is placed by the yeast manufacturer on the block of pasty yeast or in the pocket containing the dose of powdered yeast, before this yeast is delivered to the baker. The dose of yeast and the proportional dose of additive thus form a unit which is prepared before use.

The coefficient of proportionality of the weight of additive to the weight of yeast is determined in the laboratory as a function of the properties of the flour, which themselves depend on the harvest, and as a function of the method of baking envisaged, direct baking or baking with deep-freezing. An example will be given below.

It may be noted that the use of a quantity of additive proportional to the quantity of the yeast used represents an innovation as compared with the most generally widespread mode of use in which efforts are made, more or less empirically, to adjust the quantity of additive in proportion to the quantity of flour (or of water used, which itself is metered in an amount equal to about 60% of the weight of flour).

This innovation brings about a fundamental change in current manufacturing data by having an important effect on the enzymatic activities of the flour.

In practice, the fact of adding a dose of additive which is proportional to the quantity of yeast promotes the equilibrium of all the enzymatic reactions which take place between the flour and the yeast.

When the industrial baker or craftsman needs to modify the dose of yeast for various reasons, for example as a result of changes in the quality of the flour from year to year, the dose of additive will be automatically modified, thus promoting the maintenance of the enzymatic equilibrium.

Moreover, because the additive will be consumed at the same time as the yeast and because it has become customary to consume the latter very soon after its preparation, the problems of impairment of the additive by heat during more or less prolonged storage will be eliminated.

In the case of a pasty block of yeast, it is easy to bury the capsule or capsules in the surface of the block by simple pressure before packaging the block for delivery to the baker.

The number of capsules will be varied in proportion to the dose of yeast.

In the case of powdered yeast, the packets containing the yeast and the capsules can be stored for months without impairment.

Since the material of the capsule is degradable, it will disappear once kneading has begun, both as a result of the mechanical action of the kneading and as a result of dissolution in the water added to the flour. The additive will thus be mixed with the dough to activate fermentation, but it should be noted that, before kneading, the additive will be completely separated from the yeast which will remain pure until the kneading stage.

The ascorbic acid will be encapsulated in the same way, unless it is placed in the same capsule as the activator if the nature of the latter permits.

It has been found that the bread obtained possesses excellent qualities. In particular, its crumb is very light and aerated.

From this aspect, it is also advantageously possible to add to the yeast, preferably in separate capsules, diacetyl tartrates (E472E) whose effect is to make the gluten network less permeable to gases, and thus to counteract the escape of the $CO_2$ which has evolved during fermentation.

Moreover, the process is well adapted to deepfreezing. The latter, which blocks fermentation, generally produces adverse effects on the yeast. It has been found that, with the new packaging process, the fermentation restarts again very satisfactorily after defrosting, which may be due to the fact that the activator, which is well protected by the capsules before use, retains all its properties for a longer period.

For example, after unbaked loaves have been deep-frozen for six months, the expansion of the defrosted loaves took place normally and a very good quality bread was obtained.

By way of example, in the case of direct baking, that is to say without deep-freezing, the following will be added to a 500g batch of baker's yeast:

a capsule containing 3 to 4 g of alpha-amylase, preferably of fungal origin, a capsule containing 1 to 1.5 g of ascorbic acid, and one or two capsules containing a total of 30 to 50 g of diacetyl tartrate (E472E).

This batch, which the baker will use as such, will be adequate for treating 25 kg of flour.

In the case of baking with deep-freezing, the dose of yeast will be doubled and, automatically, the encapsulated dose, that is to say the dose of additives, will likewise be doubled.

I claim:

1. A method of combining baking additives and yeast which are to be used in baked goods comprising:
   (a) enclosing at least one baking additive in at least one leak-proof type capsule of destructible material, said baking additive or additives being present in an amount proportional to an amount of yeast which is to be used in baking a baked good; and
   (b) combining said enclosed baking additive or additives of step (a) with said yeast to form a chemically balanced unit prior to use of said yeast and prior to supplying said combination of yeast and baking additive or additives to a baker which will use said combination in baking said baked good.

2. The method according to claim 1 wherein said baking additives are an amylase-based additive and ascorbic acid present in an amount of from about 3-4 grams of said amylase-based additive and from about 1-1.5 grams of ascorbic acid per each 500 grams of said yeast being used in direct baking and wherein said amylase-based additive and ascorbic acid are each enclosed in a separate leak-proof type capsule of destructible material.

3. The method according to claim 1 wherein for each 500 grams of said yeast utilized, at least one capsule containing from about 30-50 grams of diacetyl tartrate is combined with said yeast.

4. The method according to claim 1 wherein said yeast is present in a pasty state and said capsule or capsules are buried in said yeast.

5. The method according to claim 1 wherein said yeast is present in a powdered state which is enclosed in a packet and said capsule or capsules are placed in said packet containing said yeast.

* * * * *